United States Patent [19]
Yoshio et al.

[11] Patent Number: 5,341,353
[45] Date of Patent: Aug. 23, 1994

[54] ACTUATOR POSITION DETECTOR, ACTUATOR POSITION CONTROLLER AND TRACK SEARCH CONTROLLER

[75] Inventors: Junichi Yoshio; Yoshitaka Shimoda, both of Tokorozawa, Japan

[73] Assignee: Pioneer Electronic Corporation, Tokyo, Japan

[21] Appl. No.: 102,111

[22] Filed: Aug. 4, 1993

Related U.S. Application Data

[63] Continuation of Ser. No. 824,584, Jan. 23, 1992, abandoned.

[30] Foreign Application Priority Data

Jan. 30, 1991 [JP] Japan .................................. 3-009956

[51] Int. Cl.$^5$ ................................................ G11B 7/00
[52] U.S. Cl. ........................... 369/44.28; 369/44.29; 369/44.32; 369/44.41
[58] Field of Search ............... 369/44.11, 44.42, 44.41, 369/44.13, 32, 44.37, 44.34, 44.35, 44.36, 44.26, 124, 44.27, 44.28, 44.29

[56] References Cited

U.S. PATENT DOCUMENTS

| | | | |
|---|---|---|---|
| 4,750,162 | 6/1988 | Tajima | 369/44.11 |
| 4,864,552 | 9/1989 | Getreuer et al. | 369/44.34 |
| 4,866,688 | 9/1989 | Ohtake | 369/44.13 |
| 5,049,733 | 9/1991 | Yoshifusa et al. | 369/44.11 |
| 5,084,849 | 1/1992 | Ishii et al. | 369/44.35 |
| 5,123,002 | 6/1992 | Tateishi | 369/44.32 |
| 5,148,424 | 9/1992 | Wachi | 369/44.41 |

FOREIGN PATENT DOCUMENTS

| | | |
|---|---|---|
| 0392775 | 10/1990 | European Pat. Off. . |
| 0409469 | 1/1991 | European Pat. Off. . |
| 62-329153 | 12/1987 | Japan ................................. 369/44.34 |

Primary Examiner—Aristotelis Psitos
Assistant Examiner—Nabil Hindi
Attorney, Agent, or Firm—Kane, Dalsimer, Sullivan, Kurucz, Levy, Eisele and Richard

[57] ABSTRACT

A track search controller has three two-segment photodetectors, three subtracters associated respectively with the two-segment photodetectors, a processing circuit, and a servo control ciruict. Each of the photodetectors produces two output signals based on a light beam reflected from an optical disk. Each of the subtracters produces a differential output signal representing the difference between the output signals from the associated photodetector. The processing circuit generates an actuator position signal from the output signals from the subtracters. The actuator position signal contains a component indicative of a deviation of the actuator due to its vibration. The servo control circuit controls an actuator, which actuates a laser beam source, so that the actuator position signal will be of a constant value.

12 Claims, 12 Drawing Sheets

F I G. 8
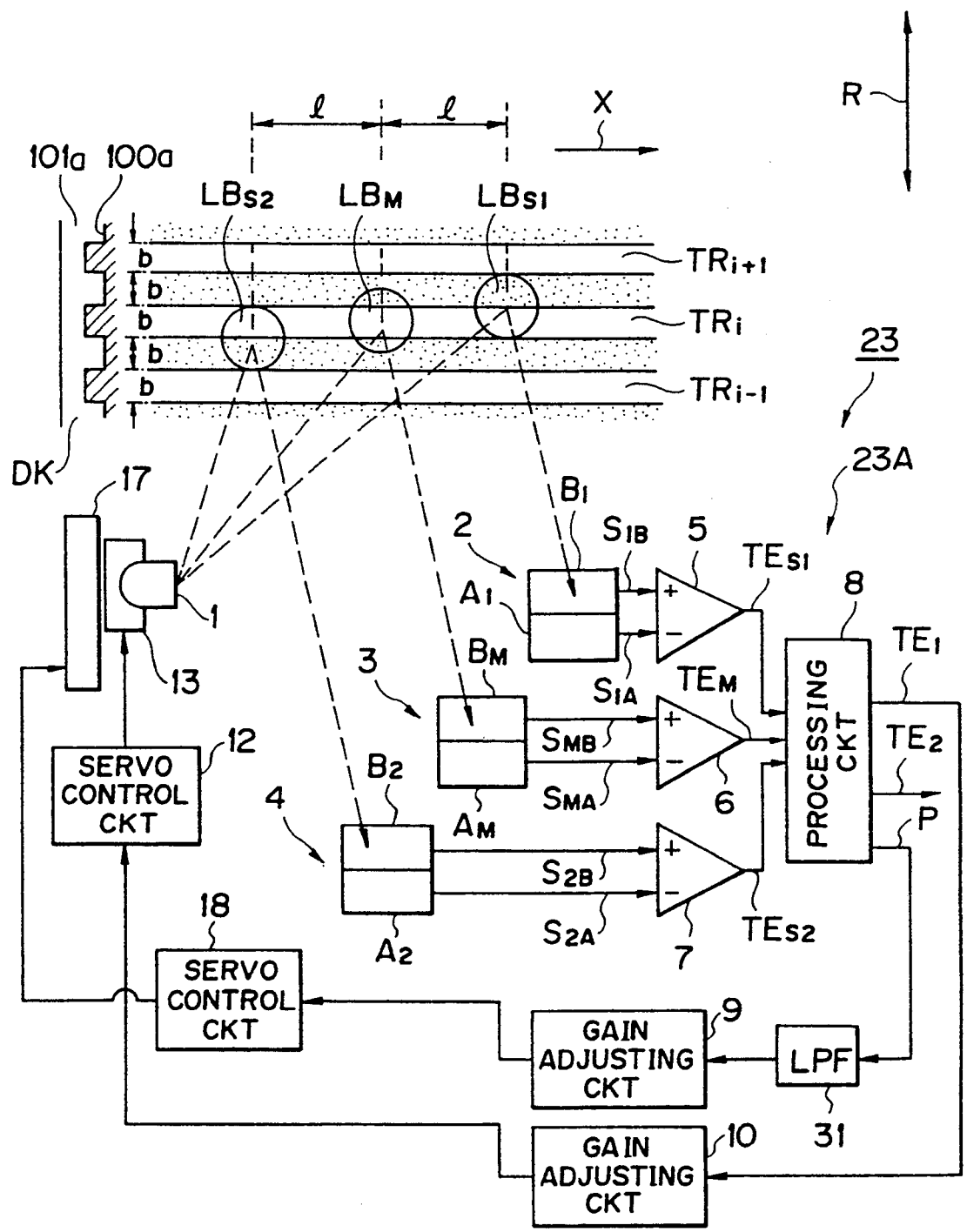

F I G. 9
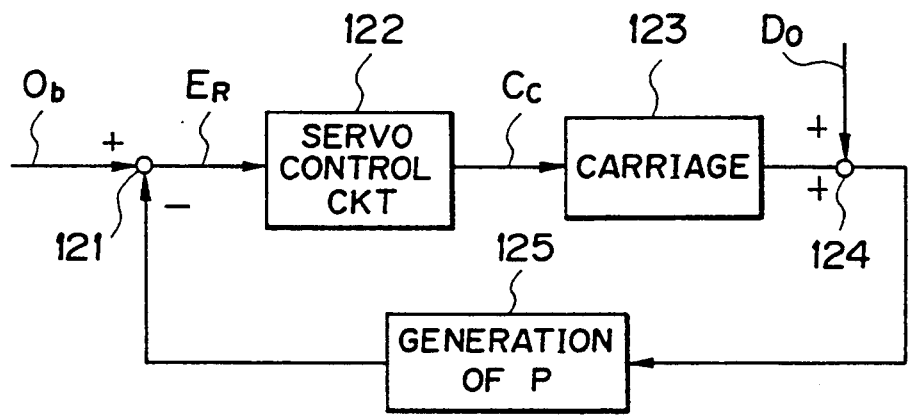

F I G. 13(A)
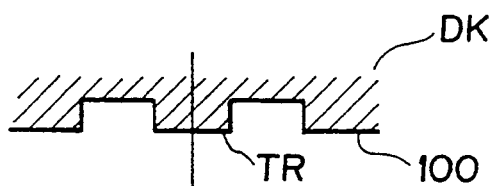
F I G. 13(B)
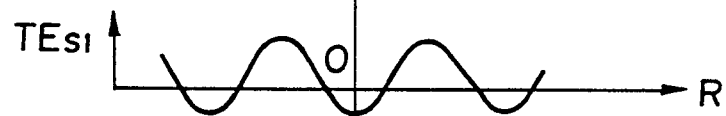
F I G. 13(C)
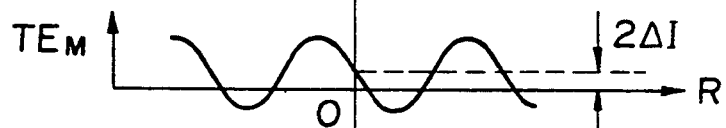
F I G. 13(D)
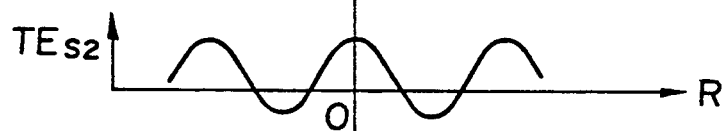
F I G. 13(E)
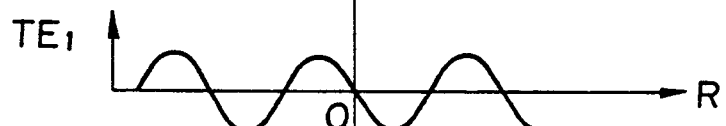
F I G. 13(F)
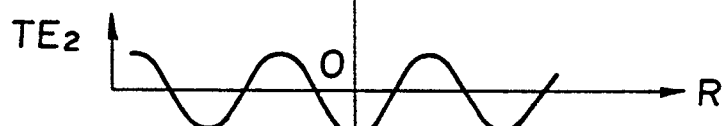
F I G. 13(G)
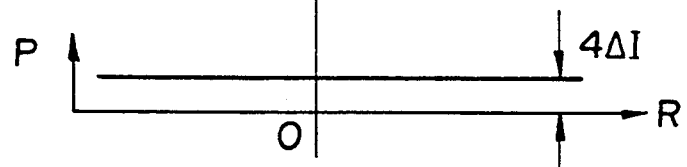

ced subsequently and intertrack areas other than the
ACTUATOR POSITION DETECTOR, ACTUATOR POSITION CONTROLLER AND TRACK SEARCH CONTROLLER This application is a continuation of application Ser. No. 07/824,584, filed Jan. 23, 1992, now abandoned.

BACKGROUND OF THE INVENTION

The present invention relates to an art of detecting and controlling an optical pickup actuator for tracking control for optical disks, and more particularly to an actuator position detector, an actuator position controller, and a track search controller for use with such optical disks.

Heretofore, various tracking control methods have been developed for use with read-only optical disks such as compact discs. Generally, it has been customary to detect whether a beam spot for reading recorded information is present on the center axis of a recording track of the optical memory disk according to the three beam method or the radial push-pull method (spot-on-track detection).

In the three-beam method, two satellite spots, i.e., leading and trailing spots, are projected onto the optical disc at positions forward and rearward, respectively, of a main scanning spot for reading recorded information from a recording track. The leading and trailing spots are spaced radially from each other by a certain offset in a direction normal to the track direction, i.e., the axis (center line) of the recording track, along which the main scanning spot travels. Reflected beams from the leading and trailing spots on the optical disk are detected by respective photodetectors, and the difference between photoelectrically converted output signals from the photodetectors is calculated and produced as a differential output signal or tracking error signal. When the main scanning spot exists on the axis of the recording track, the differential output signal is of a zero value. However, when the main scanning spot exists off the axis of the recording track, the differential output signal is not of a zero value but of a positive or negative value. According to a tracking servo control process, an actuator actuates an objective lens of an optical pickup to control the position of the spots on the optical disk so that the differential output signal becomes zero. In a track jump control process, the position of the spots can also be controlled by counting zero crossings where the differential output signal becomes zero.

The spot-on-track detection is possible according to the three-beam method insofar as the optical memory disk is a read-only optical disk. More specifically, as shown in FIG. 12 of the accompanying drawings, the read-only optical disk has recording tracks (shown blank) that are composed of pits representing information signals, and the intensity of light reflected from these pits is less than the intensity of light reflected from mirror-finish areas (shown stippled) other than the recording tracks. That is, there is a radial contrast, i.e., the difference between the intensity of light reflected from tracks or grooves and the intensity of light reflected from intertrack areas or lands, between the recording tracks and the intertrack mirror finish areas. Consequently, the differential output signal is not zero if the main scanning spot is off track.

There are known WORM (Write Once Read Many) optical memory disks and E-DRAW (Erasable Direct Read After Write) optical disks. These optical disks have a non-recorded region that includes tracks (often referred to as grooves) where information is to be recorded subsequently and intertrack areas other than the tracks. In the non-recorded region, the intensity of light reflected from these tracks and the intensity of light reflected from the intertrack areas are almost the same as each other, i.e., there is no substantial radial contrast between the tracks and the intertrack areas. Therefore, it is highly difficult to effect the spot-on-track detection in the non-recorded region according to the three beam method since the differential output signal is zero regardless of whether the main scanning spot is on track or off track.

The radial push-pull method, which is effective to carry out the spot-on-track detection on such WORM and E-DRAW optical memory disks, employs a two-segment photodetector or two photodetector halves PD as shown in FIG. 1(A). When a light beam is applied as a scanning spot to an optical memory disk, it is reflected as light of a zeroth-order $L_0$ and light of positive and negative first orders $L_{+1}$, $L_{-1}$ due to an irregular disk surface configuration that is composed of a recording track (groove) TR and an intertrack area other than the recording track TR. The reflected light is applied to the two photodetector halves PD in three areas, i.e., the first area $S_0$ where the zeroth-order light is applied, the second area $S_{+1}$ where the zeroth-order light $L_0$ and the positive first order light $L_{+1}$ are applied as diffracted, and the third area $S_{-1}$ where the zeroth-order light $L_0$ and the negative-first-order light $L_{-1}$ are applied as diffracted.

The two photodetector halves PD have respective photodetector surfaces A, B whose output terminals are connected to the respective input terminals of a subtracter, which produces a differential output signal or tracking error signal representative of the difference between output signals from the photodetector halves PD. When the scanning spot is on track, the intensity of light applied to the second area $S_{+1}$ and the intensity of light applied to the third area $S_{-1}$ are equal to each other, and hence the differential output signal is zero. When the scanning spot is off track, the intensity of light applied to the second area $S_{+1}$ and the intensity of light applied to the third area $S_{-1}$ are different from each other, and hence the differential output signal is of a positive or negative value. Consequently, the push-pull method is capable of carrying out the spot-on--track detection.

However, if the optical memory disk is radially inclined or the lens of the optical system in the optical pickup is displaced off an optical axis, then a light spot offset $\Delta I$ (see FIG. I(B)) occurs on the photodetector according to the push-pull method. With the light spot offset $\Delta I$, even when the scanning spot is right on the axis of the recording track TR, the produced tracking error signal is of a value $2\Delta I$ (FIG. 2), but not zero, and the tracking servo control process is not properly performed.

It has been proposed in U.S. patent application Ser. No. 779,013 to employ three light beams, determine push-pull differential output signals from these three light beams, and process the three push-pull differential output signals for affecting a good tracking servo control process in the non-recorded region of an optical disk while removing the effect of the offset.

According to the conventional tracking servo control arrangement, the actuator for controlling the position of an objective lens is fixedly mounted on an optical pickup by a spring or the like, and the optical pickup is supported on a carriage for movement in the radial direction of the optical disk. When the optical pickup is moved for a track jump such as in a high speed search mode, the actuator tends to vibrate in the radial direction of the optical disk as shown in FIG. 3. At this time, the actuator moves with a vibration along a path $P_A$. The actuator vibrates primarily at a constant frequency, known as a minimum resonant frequency $f_0$, usually in the range of from 10 to 100 Hz.

When the actuator thus vibrates, more zero crossings are counted than they actually are, and the track jump is finished before the optical pickup reaches a desired track position. Accordingly, the time required to search for a desired track is relatively long. It has been customary to cope with the vibration of tile actuator with a sensor for detecting the position of the objective lens. However, the prior solution has proven unsatisfactory in that the optical pickup and the track search mechanism are complex in structure and large in size, and the sensor has to be provided as a dedicated sensor.

SUMMARY OF THE INVENTION

In view of the aforesaid difficulties of the prior art, it is an object of the present invention to provide an actuator position detector for accurately detecting the position of an actuator based on an optically read signal, without the need for a dedicated lens position detector, and also to provide an actuator position controller and a track search controller employing such an actuator position detector.

According to one aspect of the present invention, there is provided an actuator position detector for detecting the position of an actuator to control the position of a light spot on a signal recording surface of an optical disk based on a light beam reflected from the signal recording surface of the optical disk, the actuator position detector comprising light-emitting means for applying, to the signal recording surface of the optical disk, a first light spot, a second light spot spaced forwardly from the first light spot by a distance along the axis of the recording track and spaced radially from the first light spot by a distance in a direction perpendicular to the axis of the recording track, and a third light spot spaced rearwardly from the first light spot by a distance along the axis of the recording track and spaced radially from the first light spot on the opposite side to the second light spot with respect to the axis of the recording track by a distance in a direction perpendicular to the axis of the recording track, first photodetector means having two divided photodetector surfaces, for photoelectrically converting a light beam reflected from tile first light spot into an electric signal, second photodetector means having two divided photodetector surfaces, for photoelectrically converting a light beam reflected from the second light spot into an electric signal, third photodetector means having two divided photodetector surfaces, for photoelectrically converting a light beam reflected from the third light spot into an electric signal, and processing means for calculating a second differential output signal representing the difference between output signals from the photodetector surfaces of the second photodetector means, calculating a third differential output signal representing the difference between output signals from the photodetector surfaces of the third photodetector means, and producing an actuator position signal representing the sum of the second and third differential output signals.

According to another aspect of the present invention, there is provided an actuator position controller for detecting and controlling the position of an actuator to control the position of a light spot on a signal recording surface of an optical disk based on a light beam reflected from the signal recording surface of the optical disk, the actuator position detector comprising light emitting means for applying, to the signal recording surface of the optical disk, a first light spot, a second light spot spaced forwardly from the first light spot by a distance along the axis of the recording track and spaced radially from the first light spot by a distance in a direction perpendicular to the axis of the recording track, and a third light spot spaced rearwardly from the first light spot by a distance along the axis of the recording track and spaced radially from the first light spot on the opposite side to the second light spot with respect to the axis of the recording track by a distance in a direction perpendicular to the axis of the recording track, first photodetector means having two divided photodetector surfaces, for photoelectrically converting a light beam reflected from the first light spot into an electric signal, second photodetector means having two divided photodetector surfaces, for photoelectrically converting a light beam reflected from the second light spot into an electric signal, third photodetector means having two divided photodetector surfaces, for photoelectrically converting a light beam reflected from the third light spot into an electric signal, processing means for calculating a second differential output signal representing the difference between output signals from the photodetector surfaces of the second photodetector means, calculating a third differential output signal representing the difference between output signals from the photodetector surfaces of the third photodetector means, and producing an actuator position signal representing the sum of the second and third differential output signals, and control means for controlling the position of the actuator based on the actuator position signal.

According to still another aspect of the present invention, there is provided a track search controller for detecting the position of an actuator to control the position of a light spot on a signal recording surface of an optical disk based on a light beam reflected from the signal recording surface of the optical disk, while moving the light spot radially across the optical disk, and for detecting a crossing by the light spot of the axis of a recording track on the optical disk to move the light spot to a desired recording track on the optical disk, the track search controller comprising light emitting means for applying, to the signal recording surface of the optical disk, a first light spot, a second light spot spaced forwardly from the first light spot by a distance along the axis of the recording track and spaced radially from the first light spot by a distance in a direction perpendicular to the axis of the recording track, and a third light spot spaced rearwardly from the first light spot by a distance along the axis of the recording track and spaced radially from the first light spot on the opposite side to the second light spot with respect to the axis of the recording track by the second distance in a direction perpendicular to the axis of the recording track, first photodetector means having two divided photodetector surfaces, for photoelectrically converting a light beam reflected from the first light spot into an electric signal, second photodetector means having two divided photodetector surfaces, for photoelectrically converting a light beam reflected from the second light spot into an electric signal, third photodetector means having two divided photodetector surfaces, for photoelectrically converting a light beam reflected from the third light spot into an electric signal, processing means for calculating a first differential output signal representing the difference between output signals from the photodetector surfaces of the first photodetector means, calculating a second differential output signal representing the difference between output signals from the photodetector surfaces of the second photodetector means, calculating a third differential output signal representing the difference between output signals from the photodetector surfaces of the third photodetector means, producing a first light spot position signal representing the difference between a multiple of the sum of the second and third differential output signals and a real number, and the first differential output signal, producing a second light spot position signal representing the difference between the second and third differential output signals, producing an actuator position signal representing the sum of the second and third differential output signals, and control means for controlling the actuator so that the actuator position signal has a constant value, while moving the light emitting means to a position near a predetermined recording track in a radial direction of the optical disk, and for subsequently controlling the actuator so that the light spots are projected onto the predetermined recording track, with the first and second light spot position signals.

With the present invention, the position of the actuator can accurately be detected even in a non-recorded region of the optical disk by processing optically read signals without employing a dedicated lens position sensor or the like. The actuator can also be controlled in position, and the process of searching for a desired track can be carried out based on the detected actuator position.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

In the accompanying drawings:

FIG. 8 is a block diagram of a track search controller according to a third embodiment of the present invention;

FIG. 9 is a block diagram showing a manner in which the track search controller according to the third embodiment operates; and FIGS. 10(A) through 10(D), 11(A) and 11(B), 12 and 13(A) through 13(G) are diagrams illustrating the principles of operation of the track search controller, respectively.

DETAILED DESCRIPTION OF THE PREFERRED EMBODIMENTS

Prior to describing the present invention in detail, the principles of the present invention will be described below.

Figure 1A:
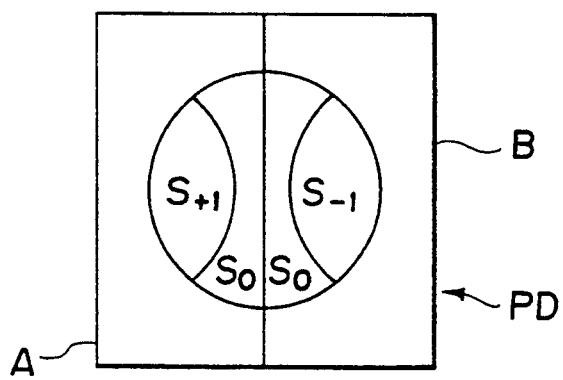
FIGS. 1(A) and 1(B) are diagrams illustrative of a light spot offset in a photodetector according to the radial push-pull method, respectively.
Figure 1B:
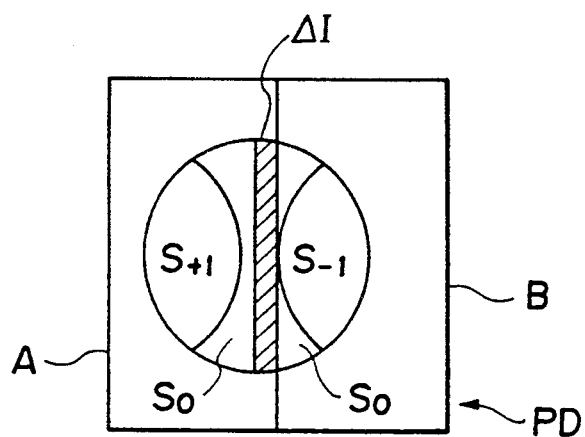
Figure 2A:
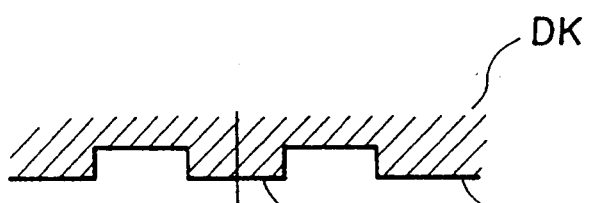
FIG. 2(A) and 2(B) is a diagram illustrative of a light spot offset in a photodetector according to the push-pull method.
Figure 2B:
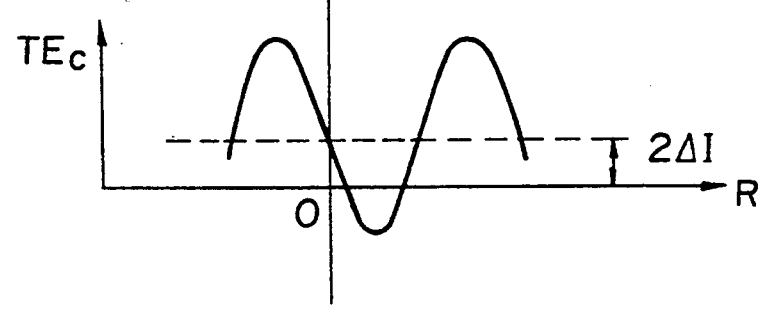
Figure 3:
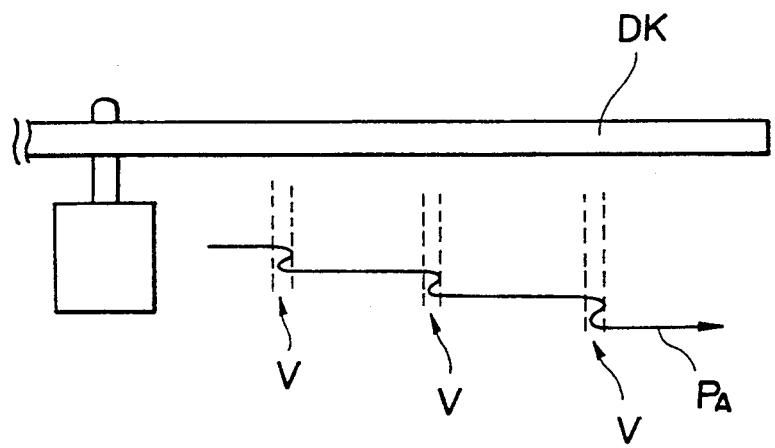
FIG. 3 is a diagram illustrative of a problem in a conventional tracking search process.
Figure 10A:
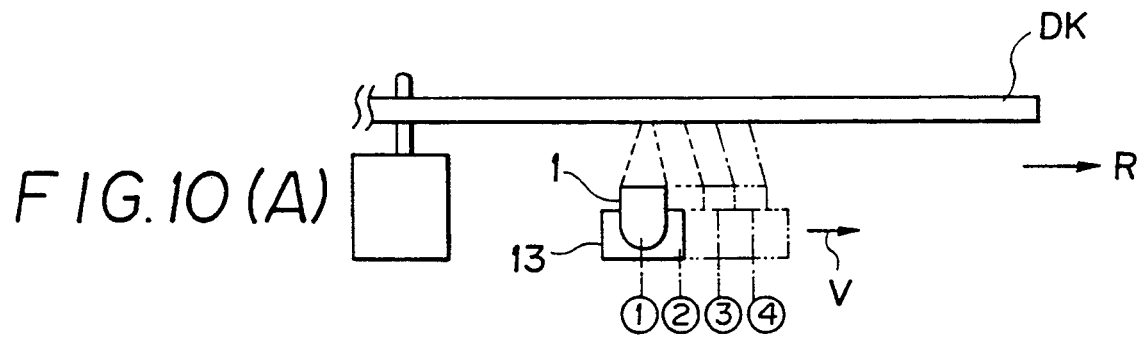
Figure 10B:
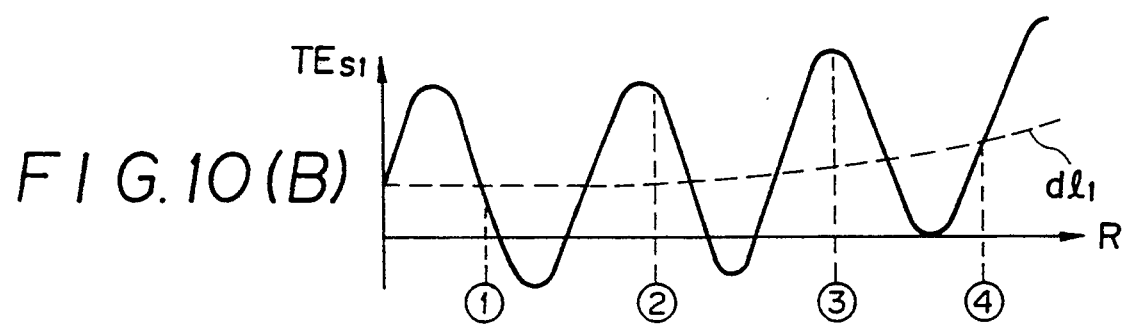
Figure 10C:
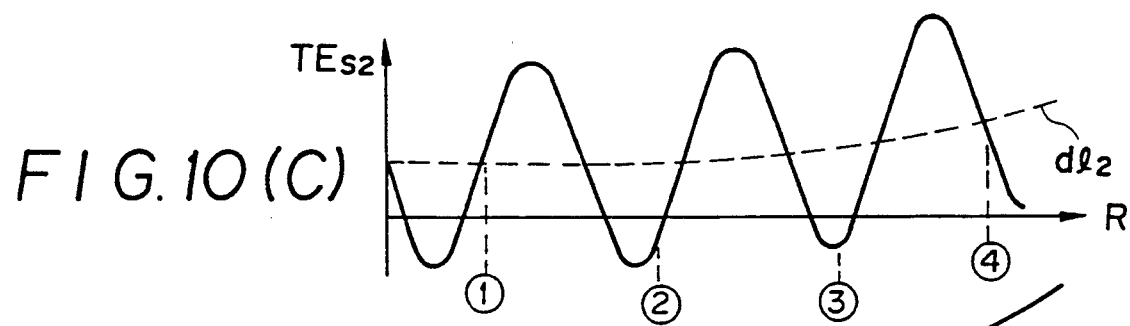

In a track search process, an actuator 13 (FIG. 4) for actuating a laser beam source 1 tends to deviate from a predetermined central position as shown in FIG. 10(A) due to a vibration V of the actuator 13 caused by movement of a carriage 17 in the radial direction of an optical disk as shown in FIG. 3. At this time, an offset is developed in the intensity of light detected by a photodetector as shown in FIGS. 1(A), 1(B), 2(A) and 2(B). The component of the offset resulting from the deviation of the actuator 13 is substantially proportional to the vibration-induced deviation of the actuator 13 from its central position as shown in FIGS. 10(B) and 10(C). That is, if the vibration is violent, That is, if the vibration is violent the deviation of the actuator 13 becomes large. Therefore, the offset may be used as information indicating the position of the actuator 13. In FIGS. 10(B) and 10 (C), two dotted lines dl₁ and dl₂ indicate two offsets of $TE_{S1}$ and $TE_{S2}$ mentioned after at each of positions ①②③ and ④.

Figure 10D:
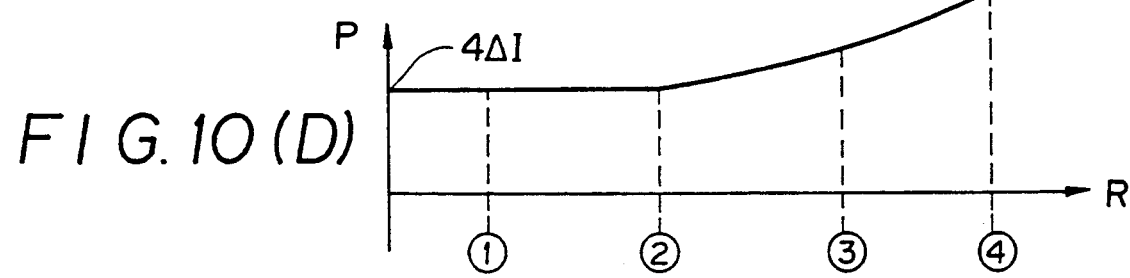
Figure 12:
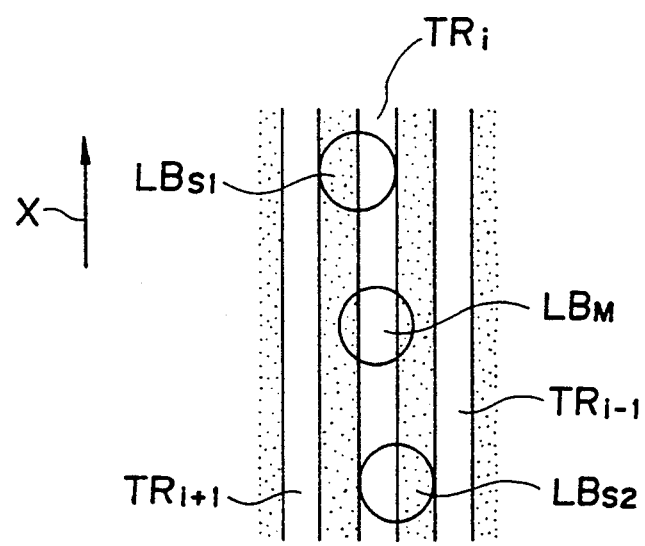

As shown in FIG. 12, three light spots are projected onto the optical disk, and the reflected light beams are detected and converted into electric signals that are processed into signals, whose magnitudes and phase are as shown in FIGS. 13(B) through 13(G). An actuator position signal P, which is indicative of the sum of second and third differential output signals, $TE_{S1}$, $TE_{S2}$, corresponds to the deviation of the actuator from its central position as shown in FIG. 10(D). The deviation of the actuator due to its vibration from the central position can be determined by subtracting an offset 4ΔI indicating the actuator deviation from the actuator position signal P.

While the actuator 13 is being controlled against vibration so that the actuator position signal P will be kept at a constant value based on first and second light spot position signals $TE_1$, $TE_2$, zero crossings where the first light spot position signal $TE_1$ (FIG. 13(D)) is zero and the second light spot position signal $TE_2$ (FIG. 13(F)) is of a negative maximum value, for example, are counted. Since each zero crossing indicates one recording track, a desired track position can be searched for, and the light spots can be moved to the desired track position based on the count of zero crossings.

First Embodiment

Figure 4:
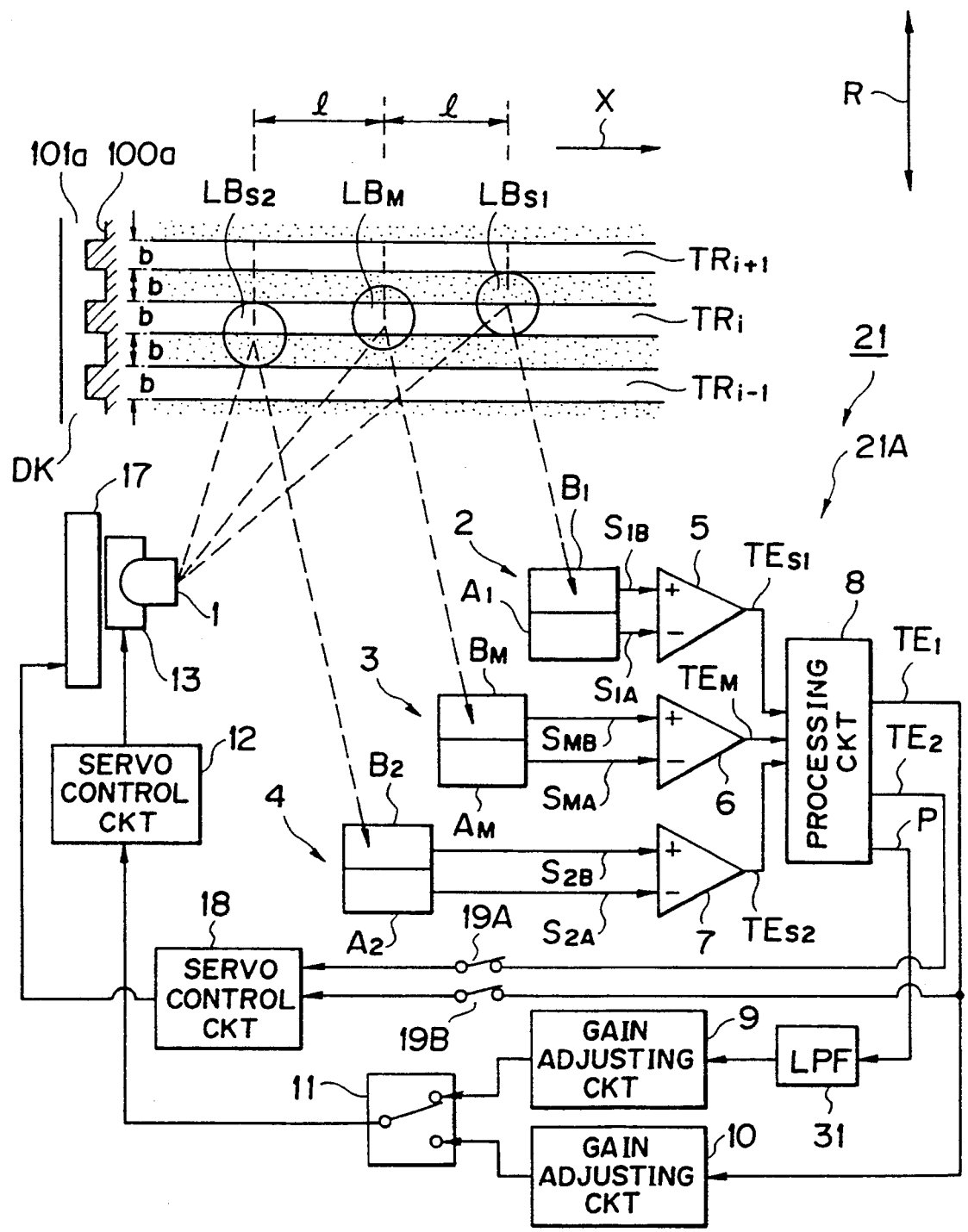
FIG. 4 is a block diagram of a track search controller according to a first embodiment of the present invention.

FIG. 4 shows a track search controller 21 according to a first embodiment of the present invention.

The track search controller 21 comprises a laser beam source 1 as a light-emitting means, a two-segment photodetector 3 as a first photodetector means, a two-segment photodetector 2 as a second photodetector means, a two-segment photodetector 4 as a third photodetector means, subtracters 5, 6, 7, a processing circuit 8, gain adjusting circuits 9, 10, a selector switch 11, a servo control circuit 12, an actuator 13, a carriage 17, a servo control circuit 18, and selector switches 19A, 19B.

The subtracters 5, 6, 7 and the processing circuit 8 jointly serve as a processing means. The gain adjusting circuits 9, 10, the selector switch 11, the servo control circuit 12, the selector switches 19A, 19B, and the servo control circuit 18 jointly serve as a control means. The laser beam source 1, the two-segment photodetectors 2, 3, 4, the subtracters 5, 6, 7, and the processing circuit 8 jointly serve an actuator position detector 21A.

The laser beam source 1 comprises various optical components (not shown) including a laser diode, lenses, a half-silvered mirror, and others, and applies light spots on a recording track $TR_i$ on the signal recording surface 100 of an optical memory disk which has a substrate 101. The laser beam source 1 is positionally adjustable by the actuator 13, and can also be moved radially (in a radial direction R) with respect to the disk by the carriage 17. The actuator 13 may usually comprise an electromagnetic coil, for example.

Each of the light spots has a diameter of $2b$ and travels in a direction X. Each of the recording tracks TR and each of the intertrack areas has a width of b. The laser beam source 1 applies a main light spot $LB_M$ as a first light spot to a recording track (groove) $TR_i$ on its axis. The laser beam source 1 also applies a leading light spot $LB_{S1}$ as a second light spot spaced forwardly from the main light spot $LB_M$ by a distance l along the track axis and also spaced radially from the main light spot $LB_M$ toward an adjacent recording track $TR_{i+1}$ by a distance $b/2$ (which is about a quarter of the interaxial distance between two adjacent recording tracks) in a direction normal to the track axis. Therefore, the outer edge of the leading light spot $LB_{S1}$ is not superimposed on the adjacent recording track $TR_{i+1}$. The laser beam source 1 also applies a trailing light spot $LB_{S2}$ as a third light spot spaced rearwardly from the main light spot $LB_M$ by a distance l along the track axis and also spaced radially from the main light spot $LB_M$ toward an adjacent recording track $TR_{i-1}$ by a distance $b/2$ in a direction normal to the track axis. Therefore, the outer edge of the leading light spot $LB_{S2}$ is not superimposed on the adjacent recording track $TR_{i-1}$.

The two-segment photodetector 3 has photodetector surfaces $A_M$, $B_M$ that are divided from each other by a parting line parallel to the track axis. The photodetector surface $A_M$ has an output terminal connected to a negative input terminal of the subtracter 6, and the photodetector surface $B_M$ has an output terminal connected to a positive input terminal of the subtracter 6. The two-segment photodetector 2 has photodetector surfaces $A_1$, $B_1$ that are divided from each other by a parting line parallel to the track axis. The photodetector surface $A_1$ has an output terminal connected to a negative input terminal of the subtracter 5, and the photodetector surface $B_1$ has an output terminal connected to a positive input terminal of the subtracter 5. The two-segment photodetector 4 has photodetector surfaces $A_2$, $B_2$ that are divided from each other by a parting line parallel to the track axis. The photodetector surface $A_2$ has an output terminal connected to a negative input terminal of the subtracter 7, and the photodetector surface $B_2$ has an output terminal connected to a positive input terminal of the subtracter 7. The subtracters 5, 6, 7 have respective output terminals connected to input terminals of the processing circuit 8.

The processing circuit 8 has output terminals connected to the gain adjusting circuits 9, 10 and also to the servo control circuit 18 through the selector switches 19A, 19B. The gain adjusting circuits 9, 10 are connected to the servo control circuit 12 through the selector switch 11. The servo control circuit 12 controls movement of the actuator 13, whereas the servo control circuit 18 controls movement of the carriage 17.

Operation of the track search controller 21 will be described below with reference to FIGS. 4, 12, and 13(A) through 13(G).

The light reflected from the main light spot $LB_M$ is detected by the two-segment photodetector 3 and photoelectrically converted thereby. The photodetector surface $A_M$ applies an output signal $S_{MA}$ to the subtracter 6, and the photodetector surface $B_M$ applies an output signal $S_{MB}$ to the subtracter 6. The subtracter 6 produces a first differential output signal $TE_M$ as follows:

$$TE_M = S_{MB} - S_{MA}$$

FIG. 13(C) shows the first differential output signal $TE_M$ (push-pull output signal) that is plotted on a vertical axis against a radial distance represented by a R-axis normal to the track axis. The first differential output signal $TE_M$ is indicated by a sine curve, and has a signal offset $2\Delta I$ in FIG. 13(C).

The light reflected from the leading light spot $LB_{S1}$ is detected by the two-segment photodetector 2 and photoelectrically converted thereby. The photodetector surface $A_1$ applies an output signal $S_{1A}$ to the subtracter 5, and the photodetector surface $B_1$ applies an output signal $S_{1B}$ to the subtracter 5. The subtracter 5 produces a second differential output signal $TE_{S1}$ as follows:

$$TE_{S1} = S_{1B} - S_{1A}$$

FIG. 13(B) shows the second differential output signal $TE_{S1}$ (push-pull output signal) that is plotted on a vertical axis against a radial distance represented by a R-axis normal to the track axis, The second differential output signal $TE_{S1}$ is indicated by a sine curve, but is out of phase with the first differential output signal $TE_M$.

The light reflected from the trailing light spot $LB_{S2}$ is detected by the two-segment photodetector 4 and photoelectrically converted thereby. The photodetector surface $A_2$ applies an output signal $S_{2A}$ to the subtracter 7, and the photodetector surface $B_2$ applies an output signal $S_{2B}$ to the subtracter 7. The subtracter 7 produces the third differential output signal $TE_{S2}$ as follows:

$$TE_{S2} = S_{2B} - S_{2A}$$

FIG. 13(D) shows the third differential output signal $TE_{S2}$ (push-pull output signal) that is plotted on a vertical axis against a radial distance represented by a R-axis normal to the track axis. The second differential output signal $TE_{S2}$ is indicated by a sine curve, but is out of phase with the first differential output signal $TE_M$. As can be seen from FIGS. 13(B) and 13(D), when the light spots $LB_M$, $LB_{S1}$, $LB_{S2}$ are applied to the optical memory disk, the produced second and third differential output signals $TE_{S1}$, $TE_{S2}$ are out of phase by 180° with each other. Then, the processing circuit 8 calculates first and second light spot position signals $TE_1$, $TE_2$ according to the following equations:

$$TE_1 = TE_M - \frac{k}{2} \times (TE_{S1} + TE_{S2})$$

$$TE_2 = TE_{S1} - TE_{S2}$$

where K is the ratio of the intensity of the light reflected from the main light spot $LB_M$ to the intensity of the light reflected from the leading or trailing light spot. The processing circuit 8 comprises adders, subtracters, and multipliers in the form of operational amplifiers. The first and second light spot position signals $TE_1$, $TE_2$ have respective waveforms as shown in FIGS. 13(E) and 13(F), respectively. It can be seen from FIGS. 13(E) and 13(F) that the signal offset $2\Delta I$ is eliminated from the first light spot position signal $TE_1$. Since the second and third differential output signals $TE_{S1}$, $TE_{S2}$ are out of phase by 180° with each other, the second light spot position signal $TE_2$ is not zero, and has a maximum negative value when the main light spot $LB_M$ is on track. The number of tracks traversed by the optical pickup in a track jump control process can be detected by closing, i.e., turning on tile selector switches 19A, 19B to cause the servo control circuit 18 to search for the condition in which $TE_1 = 0$ and $TE_2 = N$ (N<0), i.e., zero crossings.

The processing circuit 8 also produces an actuator position signal P based on the following equation:

$$P = TE_{S1} + TE_{S2}$$

Figure 11:
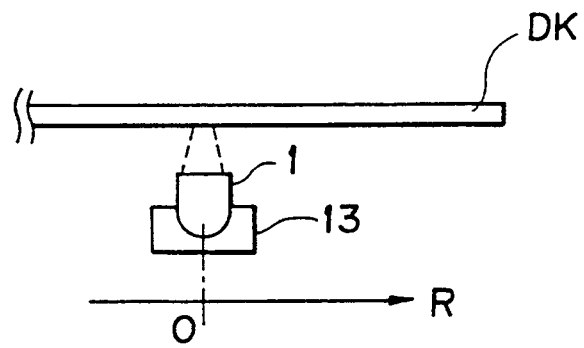
Figure 11:
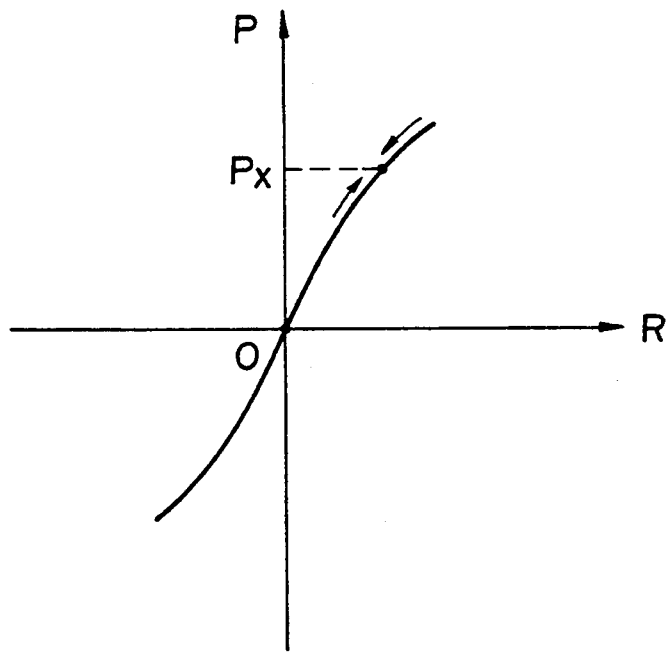

The component of the actuator position signal P, excluding a value $4\Delta I$ due to an offset caused by a disk inclination and a fixed deviation of the optical axis of the lens, represents a deviation of the actuator 13 due to its vibration. The actuator position signal P is adjusted in gain by the gain adjusting circuit 9. With the selector switch 11 connected to the gain adjusting circuit 9, the actuator position signal P is fed back to the actuator 13 by the servo control circuit 12 so that the actuator position signal P will be kept at a predetermined level Px as shown in FIG. 11(B). In this manner, the actuator 13 is prevented from vibrating due to high speed movement of the carriage 17 or the like.

The servo target level Px is usually of a value $4\Delta I$ if the actuator position signal P is of characteristics shown in FIG. 10(D), the value $4\Delta I$ being due to an offset caused by a disk inclination, etc. other than actuator vibration. The value $4\Delta I$ may be deducted from the actuator position signal P, and the actuator 13 may be controlled so that the actuator position signal P will be zero when the actuator 13 is brought into a predetermined central position.

As shown in FIGS. 13(B) and 13(D), the second and third differential output signals $TE_{S1}$, $TE_{S2}$ are out of phase by 180° with each other. However, when these signals are added to each other, the sum signal may comprise not only the offset component as shown in FIG. 13(G), but also a sinusoidal track crossing information component and an RF signal component containing recorded information of the disk. Therefore, the actuator position signal P may contain a considerable amount of noise. To remove such noise, a low pass filter 31 (see FIG. 4) may be connected between the processing circuit 8 and the gain adjusting circuit 9.

When the selector switches 19A, 19B are opened, i.e., turned off, and the selector switch 11 is shifted to the gain adjusting circuit 10, a normal tracking servo control process is carried out for controlling the actuator 13.

Figure 5:
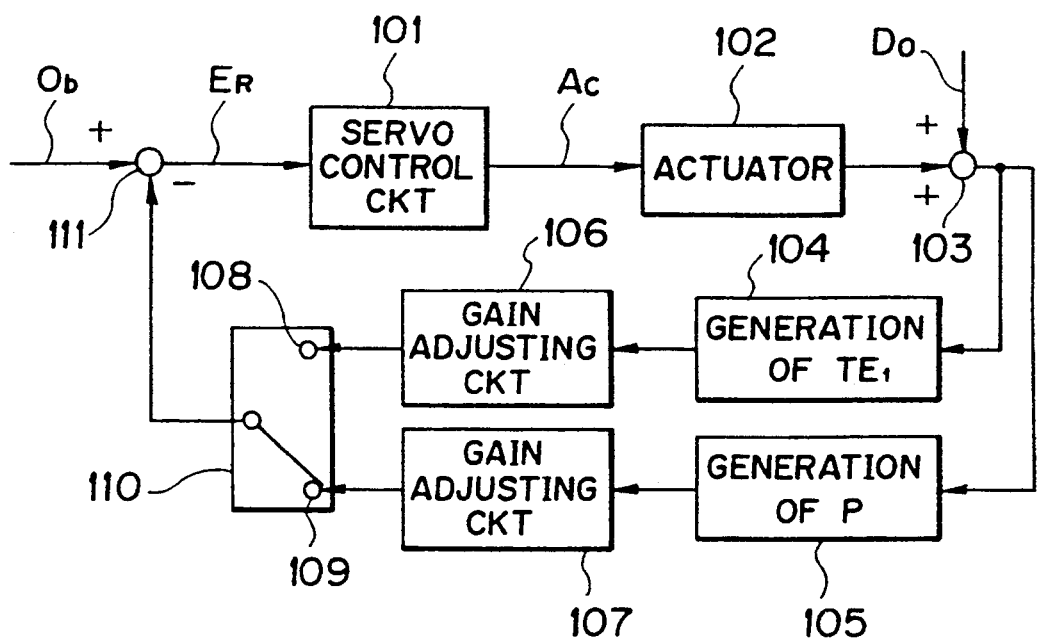
FIG. 5 is a block diagram showing a manner in which the track search controller according to the first embodiment operates.

FIG. 5 shows in block form the tracking servo control process for the actuator 13 shown in FIG. 4. In FIG. 5, a target value $O_b$ to be achieved by the tracking servo control process is applied to a subtracter 111, the target value $O_b$ being zero in this case. The subtracter 111 produces an error signal $E_R$ that represents the difference between the target value $O_b$ and the actuator position signal P. The error signal $E_R$ is applied to a servo control block 101, which applies a control signal $A_c$ to an actuator 102. To the movement of the actuator 102, there is added a disturbance $D_o$ that is external vibration applied to the actuator 102 by high speed movement of the carriage in the track jump control process or actuator vibration caused by control process. The sum of the movement of the actuator 102 and the disturbance $D_o$ applied thereto is applied from an adder 103 to blocks 104, 105 which generate signals $TE_1$, P, respectively. These signals $TE_1$, P are supplied to respective gain adjusting blocks 106, 107 that are connected respectively to contacts 108, 109 of a selector switch 110 which is connected to the subtracter 111.

Second Embodiment

Figure 6:
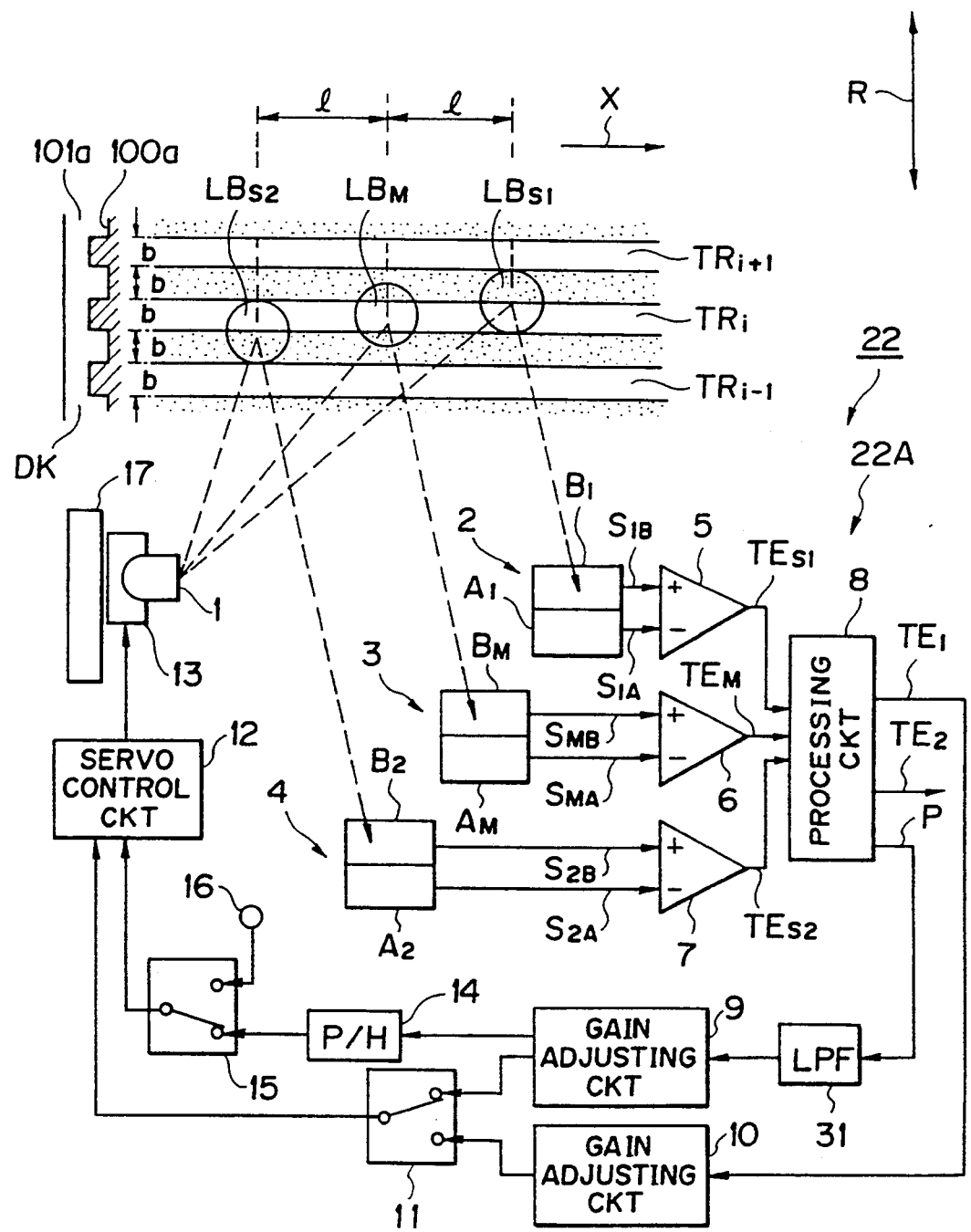
FIG. 6 is a block diagram of a track search controller according to a second embodiment of the present invention.

FIG. 6 shows a track search controller 22 according to a second embodiment of the present invention. The track search controller 22 includes an actuator position detector 22A. The track search controller 22 differs from the track search controller 21 according to the first embodiment in that a peak holding circuit 14 and a selector switch 15 are connected in series with each other between the gain adjusting circuit 9 and the servo control circuit 12.

When the selector switch 15 is shifted to an external input terminal 16, a target value for the position of the actuator 13 may be set to a desired value (such as a value of zero). When the selector switch 15 is shifted to the peak holding circuit 14, an actuator position signal P immediately before a track search process is initiated may be held by the peak holding circuit 14, and given as a target value for the position of the actuator 13 to the servo control circuit 12.

In reality, the position of the actuator 13 immediately before the track search process is initiated is often not a predetermined central position. Therefore, if the target value for the position of the actuator 13 is set to P=0, then the actuator 13 tends to vibrate. Consequently, it is more effective to control the actuator 13 in the track servo control process by holding the actuator position P immediately prior to the track search process.

Figure 7:
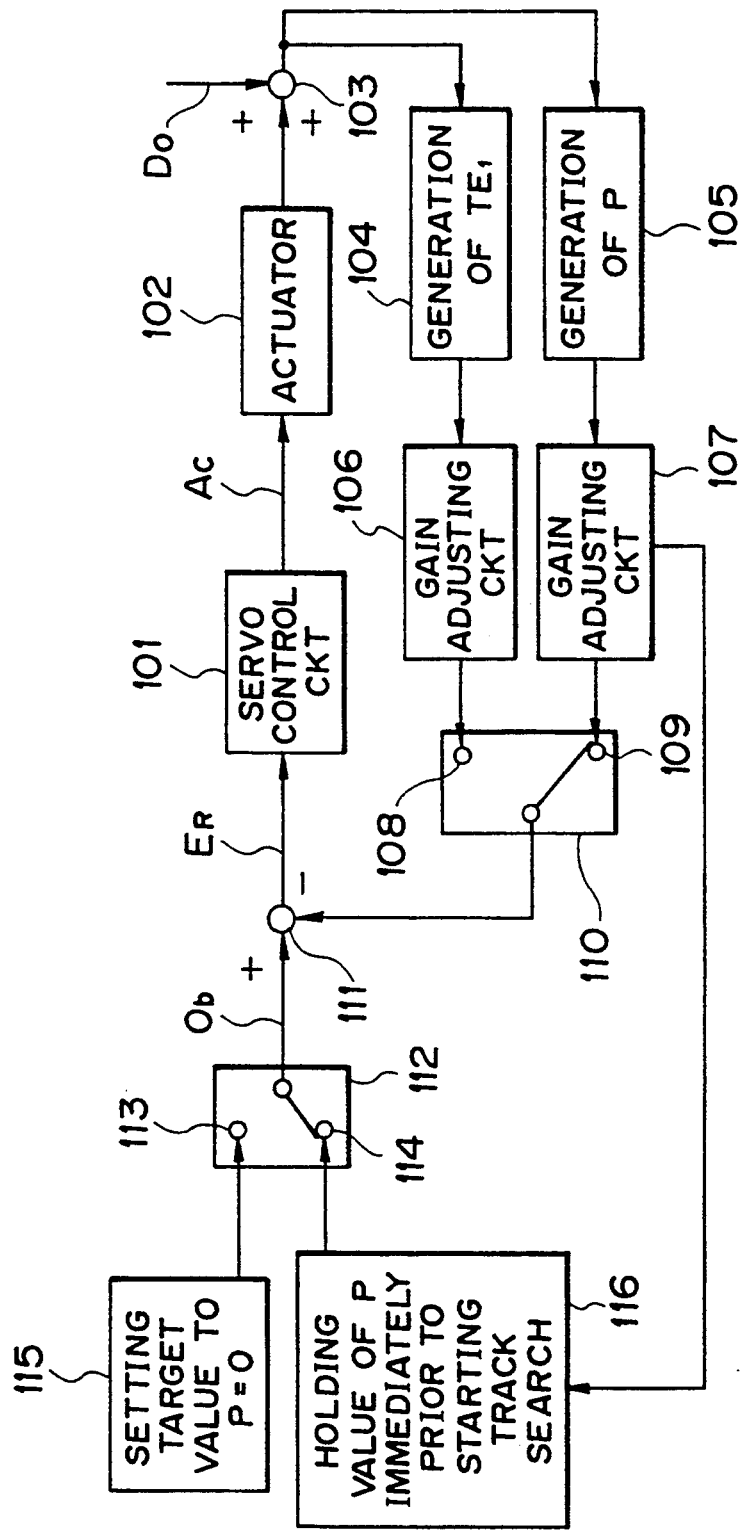
FIG. 7 is a block diagram showing a manner in which the track search controller according to the second embodiment operates.

FIG. 7 shows in block form the tracking servo control process for the actuator 13 shown in FIG. 6. The arrangement shown in FIG. 7 is basically similar to that shown in FIG. 5. However, in FIG. 7, a target value P=0 is set by a block 115, and an actuator position singal P immediately before the track search process is held by a block 116, and these blocks 115, 116 are connected respectively to contacts 113, 114 of a selector block 112, which is connected to the adder 111. Alternatively, there may be provided two servo control blocks 101 which are connected respectively to the blocks 115, 116, and may selectively be connected to the actuator 102. In such a modification, the gain adjusting block 106, 107 may be contained in the servo control blocks 101.

Third Embodiment

FIG. 8 shows a tracking servo control device 23 according to a third embodiment of the present invention. The tracking servo control device 23 includes an actuator position detector 23A. The track servo control device 23 is basically of the same arrangement as the track search controller 21 according to the first embodiment except that the actuator position signal P is applied through the low pass filter 31 and the gain adjusting circuit 9 to the servo control circuit 18 for controlling the carriage 17, and the first light spot position signal $TE_1$ is applied through the gain adjusting circuit 10 to the servo control circuit 12 for controlling the actuator 13.

With the arrangement shown in FIG. 8, even when the objective lens of the optical pickup deviates from its desired central position, the servo control circuit 18 detects the deviation based on the actuator position signal P, and controls the carriage 17 to move in a direction to eliminate the deviation. The servo control process of this type is referred to as a double-stage servo control process. Heretofore, it has been necessary to employ a sensor associated with the actuator for detecting the position of the actuator. According to the present invention, however, since the processing circuit 8 produces the actuator position signal, no sensor for detecting the position of the actuator is required.

FIG. 9 shows in block form the tracking servo control process for the carriage 17 shown in FIG. 8. The error signal $E_R$ from a subtracter 121 is applied to a servo control block 122 that produces a carriage control signal Cc to control a carriage 123. The sum of movement of the carriage 123 and a disturbance $D_o$ from an adder 124 is applied to a block 125 for generating an actuator position signal P, which is supplied to the subtracter 121.

In FIGS. 4, 6, and 8, the output signals $S_{MB}$, $S_{1B}$, $S_{2B}$ may be subtracted from the output signals $S_{MA}$, $S_{1A}$, $S_{2A}$, respectively, by the subtracters 5, 6, 7. The second light spot position signal $TE_2$ may be produced according to the following equation:

$$TE_2 = TE_{S2} - TE_{S1}$$

In this case, a zero crossing is detected when the second light spot position signal $TE_2$ is of a positive maximum value.

In the first and second embodiments, the output signals $S_{1A}$, $S_{1B}$ from the photodetector surfaces $A_1$, $B_1$ of the photodetector 2 may be added by an adder, producing a sum signal $SUM_1$, and the output signals $S_{2A}$, $S_{2B}$ from the photodetector surfaces $A_2$, $B_2$ of the photodetector 4 may be added by an adder, producing a sum signal $SUM_2$. The circuit arrangements according to the first and second embodiments may operate as a light spot position detector according to the three-beam method based on a differential signal $(SUM_1 - SUM_2)$ or $(SUM_2 - SUM_1)$ indicative of the difference constructed are compatible, through circuit switching, with the sum signals $SUM_1$, $SUM_2$. Such a light spot position detector may easily be implemented with necessary ICs added to the processing circuit. The circuit arrangements thus ordinary disc players for playback only discs such as compact discs, laser video discs, or the like.

In the above embodiments, the leading and trailing light spots are not projected onto the adjacent recording tracks. However, the leading and trailing light spots may be projected so as to be superimposed on the adjacent recording tracks. In this case, it is possible to produce the light spot position signals $TE_1$, $TE_2$.

In the above embodiments, the first and second light spot position signals $TE_1$, $TE_2$ are calculated according to the equations described above. These equations are effective only for discs where the radial contrast is almost zero. For discs, such as compact disks, where the radial contrast is not zero, the tracking error signal according to the three-beam method, i.e., the signal $(SUM_1 - SUM_2)$ or $(SUM_2 - SUM_1)$, may be employed to generate the first light spot position signal, and the output signal from the central photodetector according to the three-beam method may be employed to generate the second light spot position signal.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An actuator position controller for detecting and controlling a position of an actuator with respect to a carriage on which the actuator is movably disposed, so as to control a position of a light spot on a signal recording surface of an optical disk based on light beams reflected form the signal recording surface of the optical disk, said actuator position controller comprising:

light emitting means for applying to a signal recording surface of the optical disk, a first light spot, a second light spot spaced forwardly from said first light spot by a distance along an axis of the recording track and spaced radially from said first light spot by a distance in a direction perpendicular to the axis of the recording track, and a third light spot spaced rearwardly from said first light spot by a distance along the axis of the recording track and spaced radially from said first light spot on the opposite side to said second light spot with respect to the axis of the recording track by a distance in a direction perpendicular to the axis of the recording track;

first photodetector means having two divided photodetector surfaces, for photoelectrically converting a light beam reflected form said first light spot into an electric signal;

second photodetector means having two divided photodetector surfaces, for photoelectrically converting a light beam reflected from said second light spot into an electric signal;

third photodetector means having two divided photodetector surfaces, for photoelectrically converting a light beam reflected from said third light spot into an electric signal;

calculating means for calculating a second differential output signal representing a difference between output signal from the photodetector surfaces of said second photodetector means and a third differential output signal representing a difference between output signals from the photodetector surfaces of said third photodetector means;

processing means for producing an actuator position signal which represents a sum of said second and third differential output signals and indicates the position of the actuator with respect to a carriage; and control means for controlling a position of the actuator on the carriage based on said actuator position signal.

2. An actuator position controller according to claim 1, wherein said distance in a radial direction of the disk between the two spots is approximately a quarter of the interaxial distance between adjacent tracks on the optical disk.

3. An actuator position controller according to claim 1, wherein said control means comprises a servo control circuit for controlling the position of the actuator on the carriage, a first gain adjusting circuit for adjusting a gain of the actuator position signal and a low pass filter disposed between the processing means and the gain adjusting circuit for eliminating noise in the actuator position signal.

4. An actuator position controller according to claim 1, wherein said control means controls the position of the actuator so that the actuator position signal is of a value of zero.

5. An actuator position controller according to claim 3, wherein said control means further comprises a peak holding circuit disposed between the first gain adjusting circuit and the servo control circuit to hold an actuator position signal at a value immediately before said light emitting means starts moving radially across the optical disk.

6. A track search controller according to claim 1, wherein said distance in a radial direction of the disk between the two spots is approximately a quarter of the interaxial distance between adjacent tracks on the optical disk.

7. An actuator position controller according to claim 3, wherein said calculating means calculates a first differential output signal representing a difference between output signals from the photodetector surfaces of the first photodetector means, said processing means produces a light spot position signal representing a difference between the first differential output signal and a multiple of a sum of the second and third differential output signals and a predetermined constant, and said actuator position controller further comprises a second gain adjusting circuit for adjusting a gain of the light spot position signal and switch means for selectively supplying one of the actuator position signal and the light spot position signal to said control means.

8. A track search controller for moving a light spot in a radial direction of an optical disk on a signal recording surface thereof and positioning the light spot on a desired recording track, comprising:

light emitting means for applying, to a signal recording surface of the optical disk, a first light spot, a second light spot spaced forwardly from said first light spot by a distance along the axis of the recording track and spaced radially from said first light spot by a distance in a direction perpendicular to the axis of the recording track, and a third light spot by a distance in a direction perpendicular to the axis of the recording track, and a third light spot spaced rearwardly from said first light spot by a distance along the axis of the recording track and spaced radially from said first light spot on the opposite side to said second light spot with respect to the axis of the recording track by a distance in a direction perpendicular to the axis of the recording track;

first photodetector means having two divided photodetector surfaces, for photoelectrically converting a light beam reflected from said first light spot into an electric signal;

second photodetector means having two divided photodetector surfaces, for photoelectrically converting a light beam reflected from said second light spot into an electric signal;

third photodetector means having two divided photodetector surfaces, for photoelectrically converting a light beam reflected from said third light spot into an electric signal;

an actuator for supporting said light emitting means;

a carriage for movably supporting said actuator;

calculating means for calculating a first differential output signal representing a difference between output signals from the photodetector surfaces of said first photodetector means, a second differential output signal representing a difference between output signals from the photodetector surfaces of said second photodetector means and a third differential output signal representing a difference between output signals from the photodetector surfaces of said third photodetector means;

processing means for producing a first light spot position signal representing a difference between the first differential output signal and a multiple of a sum of said second and third differential output signals and a predetermined constant, producing a second light spot position signal representing a difference between said second and third differential output signals, and producing an actuator position signal which represents a sum of said second and third differential output signals and indicates a position of the actuator with respect to a carriage; and control means for moving the carriage in the radial direction of the optical disk so that the light spot is positioned on a target track on the basis of the first and second light spot position signals and controlling a position of the actuator on the carriage on the basis of the actuator position signal.

9. A track search controller according to claim 8, wherein said control means controls the position of the actuator so that the actuator position signal becomes a constant value.

10. A track search controller according to claim 9, wherein said control means moves the carriage in the radial direction of the optical disk on the basis of the second light spot position signal and controls the position of the carriage with respect to the tracks on the optical disk on the basis of the first light spot position signal.

11. A tracking controller for controlling a position of a light spot on a signal recording surface of an optical disk on the basis of light beams reflected from the signal recording surface of the optical disk, said controller comprising:

light emitting means for applying, to a signal recording surface of the optical disk, a first light spot, a second light spot spaced forwardly from said first light spot by a distance along an axis of the recording track and spaced radially from said first light spot by a distance in a direction perpendicular to the axis of the recording track, and a third light spot spaced rearwardly from said first light spot by a distance along the axis of the recording track and spaced radially from said first light spot on the opposite side to said second light spot with respect to the axis of the recording track by a distance in a direction perpendicular to the axis of the recording track;

an actuator for supporting said light emitting means;

a carriage for movably supporting said actuator;

first photodetector means having two divided photodetector surfaces, for photoelectrically converting a light beam reflected from said first light spot into an electric signal;

second photodetector means having two divided photodetector surfaces, for photoelectrically converting a light beam reflected from said second light spot into an electric signal;

third photodetector means having two divided photodetector surfaces, for photoelectrically converting a light beam reflected from said third light spot into an electric signal;

calculating means for calculating a first differential output signal representing a difference between output signals from the photodetector surfaces of said first photodetector means, calculating a second differential output signal representing a difference between signals from the photodetector surfaces of said second photodetector means and calculating a third differential output signal representing a difference between output signals from the photodetector surfaces of said third photodetector means;

processing means for producing a first position signal which represents a sum of said second and third differential output signals and indicates the position of the actuator with respect to the carriage and producing a second position signal representing a difference between the first differential output signal and a multiple of a sum of said second and third differential output signals and a predetermined constant; and control means for controlling the position of the carriage with respect to the optical disk on the basis of the first position signal and controlling the position of the actuator with respect to the carriage on the basis of the second position signal.

12. A tracking controller for controlling a position of a light spot on a signal recording surface of an optical disk on the basis of light beams reflected from the signal recording surface of the optical disk, said controller comprising:

light emitting means for applying, to a signal recording surface of the optical disk, a first light spot, a second light spot spaced forwardly from said first light spot by a distance along an axis of the recording track and spaced radially from said first light spot by a distance in a direction perpendicular to the axis of the recording track, and a third light spot spaced rearwardly from said first light spot by a distance along the axis of the recording track and spaced radially from said first light spot on the opposite side to said second light spot with respect to the axis of the recording track by a distance in a direction perpendicular to the axis of the recording track;

an actuator for supporting said light emitting means;

a carriage for movably supporting said actuator;

first photodetector means having two divided photodetector surfaces, for photoelectrically converting a light beam reflected from said first light spot into an electric signal;

second photodetector means having two divided photodetector surfaces, for photoelectrically converting a light beam reflected from said second light spot into an electric signal;

third photodetector means having two divided photodetector surfaces, for photoelectrically converting a light beam reflected from said third light spot into an electric signal;

calculating means for calculating a first differential output signal representing a difference between output signals from the photodetector surfaces of said first photodetector means, calculating a second differential output signal representing a difference between output signals from the photodetector surfaces of said second photodetector means and calculating a third differential output signal representing a difference between output signals from the photodetector surfaces of said third photodetector means;

processing means for producing a first position signal which represents a sum of said second and third differential output signals and indicates the position of the actuator with respect to the carriage and producing a second position signal representing a difference between the first differential output signal and a multiple of a sum of said second and third differential output signals and a predetermined constant; and control means for controlling the position of the carriage with respect to the optical disk on the basis of the second position signal and controlling the position of the actuator with respect to the carriage on the basis of the first position signal.

* * * * *